(12) United States Patent
Iwabuchi

(10) Patent No.: US 6,333,513 B1
(45) Date of Patent: Dec. 25, 2001

(54) METHOD FOR PROCESSING ELECTRIC SIGNALS OF RADIOGRAPHIC IMAGE RECORDED IN STIMULABLE PHOSPHOR SHEET

(75) Inventor: Yasuo Iwabuchi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/510,155

(22) Filed: Feb. 22, 2000

(30) Foreign Application Priority Data

Feb. 22, 1999 (JP) .................................. 11-043328

(51) Int. Cl.[7] .......................... G01N 23/04; G01T 1/105; G03B 42/08
(52) U.S. Cl. ........................................... 250/587; 250/584
(58) Field of Search .................................... 250/582, 583, 250/584, 587

(56) References Cited

U.S. PATENT DOCUMENTS 4,944,026 * 7/1990 Arakawa et al. .................. 250/484.1

FOREIGN PATENT DOCUMENTS 2000-241919-A * 9/2000 (JP) ................................ G03B/42/02

* cited by examiner

Primary Examiner—Ricky Mack
(74) Attorney, Agent, or Firm—Sughrue Mion, PLLC

(57) ABSTRACT

A method for processing electric signals of a radiographic image which are obtained by the steps of scanning a stimulating light beam on a stimulable phosphor sheet comprising a stimulating light-reflective or -absorbent grid and stimulable phosphor-containing microcells surrounded by the grid and having a radiographic image recorded therein in a direction along the grid and photoelectrically collecting in sequence stimulated emissions emitting from the microcells, is favorably performed by detecting a signal of a grid surrounding a microcell and a signal strength corresponding to the microcell surrounded by the grid; determining a correcting value for the detected signal strength; repeating the step of determining a correcting value for a signal strength in each microcell; and processing each signal strength detected in each microcell using each correcting value determined in each microcell, in consideration of a predetermined pixel size of the radiographic image, to obtain a corrected radiographic image data.

3 Claims, 3 Drawing Sheets

(1)

(2)

METHOD FOR PROCESSING ELECTRIC SIGNALS OF RADIOGRAPHIC IMAGE RECORDED IN STIMULABLE PHOSPHOR SHEET

FIELD OF THE INVENTION

This invention relates to a method for processing electric signals of a radiographic image recorded in a stimulable phosphor sheet, which is favorably employed for reproduction of a radiographic image in a radiographic image recording and reproducing method.

BACKGROUND OF THE INVENTION

As a method replacing a conventional radiography using a combination of a radiographic film and radiographic intensifying screen, a radiation image recording and reproducing method utilizing a stimulable phosphor is practically employed. This method employs a stimulable phosphor sheet (i.e., radiation image storage panel) comprising a stimulable phosphor, and comprises the steps of causing the stimulable phosphor to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (i.e., stimulated emission); photoelectrically detecting the emitted light to obtain electric signals; and reproducing the radiation image of the object as a visible image from the electric signals. The phosphor sheet thus processed is then subjected to a step for erasing a radiation image remaining therein, and then stored for the next radiation image recording and reproducing procedure. Thus, the stimulable phosphor sheet can be repeatedly employed.

In general, a support and a protective film are provided on the top and bottom surfaces of the stimulable phosphor sheet, respectively. The stimulable phosphor sheet usually comprises a binder and stimulable phosphor particles dispersed therein, but it may consist of agglomerated phosphor without binder. The stimulable phosphor sheet containing no binder can be formed by deposition process or firing process. Further, the stimulable phosphor sheet comprising agglomerated phosphor soaked with a polymer is also known.

The radiation image recording and reproducing method is often used as X-ray radiography for medical diagnosis. In that case, it is especially desired to obtain a radiation image of high quality (particularly, high sharpness for high resolution) by applying a small dose of radiation. Therefore, the stimulable phosphor sheet is required to have a high sensitivity and to provide an image of high quality.

The sharpness of radiation image is mainly affected by diffusion or scattering of the stimulating rays in the stimulable phosphor sheet in the case that the reading process is performed by the steps of sequentially scanning the stimulating rays to divide the plane of the phosphor sheet into plural pixels, and detecting the stimulated emission by a photodetector. In this process, the procedure for reading the latent image comprises the steps of sequentially applying a light beam of the stimulating rays onto the surface of the phosphor sheet to induce the stimulated emission, and successively collecting and detecting the emission. If the stimulating rays diffuse or scatter on the place of the phosphor sheet, the stimulating rays excite the stimulable phosphor not only at the target pixel but also in its adjacent pixels. Consequently, the stimulated emission emitted from the target pixel is contaminated with that from the adjacent pixels. The contamination of the emission impairs the sharpness of the reproduced radiographic image.

For avoiding the diffusion or scattering of the stimulating ray in the stimulable phosphor sheet, it has been proposed to divide a plane of the stimulable phosphor sheet into small physically divided sections (microcells) with a partition reflecting or absorbing the stimulating rays.

Japanese Patent Provisional Publication No. 59-202100 discloses a stimulable phosphor sheet having a honey-comb structure consisting of a great number of microcells filled with stimulable phosphor. This phosphor sheet comprises a substrate and a stimulable phosphor layer provided thereon, and the honey-comb structure sectioned with a partition is further provided on the phosphor layer.

Japanese Patent Provisional Publication No. 9-15396 describes a stimulable phosphor sheet which comprises a grid having openings with a size larger than a beam spot of stimulating rays to define an emitting area of one pixel by the grid opening so that the resulting radiation image can have a high space resolution.

According to the study of the present inventor, the stimulable phosphor sheet comprising a grid and plural microcells surrounded by the grid in its stimulable phosphor layer generally has nonuniformity in the sensitivity on the respective microcells. The nonuniformity of sensitivity is caused by nonuniformity of the phosphor layer which is prepared by coating a stimulable phosphor-containing solution on a plane having a grid thereon.

The stimulable phosphor sheet having non-uniform sensitivity gives a reproduced radiation image of low quality because it has a structure noise due to nonuniformity of the sensitive material. Moreover, if the scanning space (space between one scanning line and next scanning line) is not identical to the sizes of microcells, a moire (i.e., a pattern of interfering stripes) is observed on the reproduced radiation image, to reduce the quality of the radiation image.

SUMMARY OF THE INVENTION

An object of the present invention is to provide a method for processing electric signals of a radiographic image recorded in a stimulable phosphor sheet having microcells, to reproduce the radiographic image with high image quality.

The present invention resides in a method for processing electric signals of a radiographic image which are obtained by the steps of scanning a stimulating light beam on a stimulable phosphor sheet comprising a stimulating light-reflective or light-absorbent grid and stimulable phosphor-containing microcells surrounded by the grid and having a radiographic image recorded therein in a direction along the grid and photoelectrically collecting in sequence stimulated emissions emitting from the stimulable phosphor-containing microcells, which comprises the steps of:

(1) detecting a signal of a grid surrounding a microcell and a signal strength I corresponding to the microcell surrounded by the grid, so as to determine a signal strength $I(x,y)$ in a microcell residing in a position $(x,y)$ which is determined from a size information of the stimulable phosphor sheet and an order of the detected signal corresponding to the grid;

(2) determining a correcting value for the signal strength $I(x,y)$ according to the following formula:

correcting value=$I(x,y)/I_0(x,y)$ wherein $I_0(x,y)$ is a base sensitivity strength which is predetermined in the microcell residing in the position $(x,y)$;

and (3) processing each signal strength detected in each microcell using each correcting value determined in each microcell, in consideration of a predetermined pixel size of the radiographic image, to obtain a corrected radiographic image data.

In the above-described method of the invention, the step (3) for processing each signal strength detected in each microcell comprises, if the pixel size is larger than the size of microcell and the pixel comprises plural microcells, obtaining an average of correcting values of the microcells and using the average correcting value for the pixel comprising plural microcells.

Otherwise, if the pixel size is equal to or smaller than the size of microcell, the step (3) for processing each signal strength detected in each microcell is performed using a correcting value which is determined from the correcting value of the microcell, in consideration with correcting values of its adjacent microcells.

DETAILED DESCRIPTION OF THE INVENTION

The method for processing electric signals of a radiographic image recorded in a stimulable phosphor sheet according to the present invention is further described by referring to the figures shown in the attached drawings.

Figure 1:
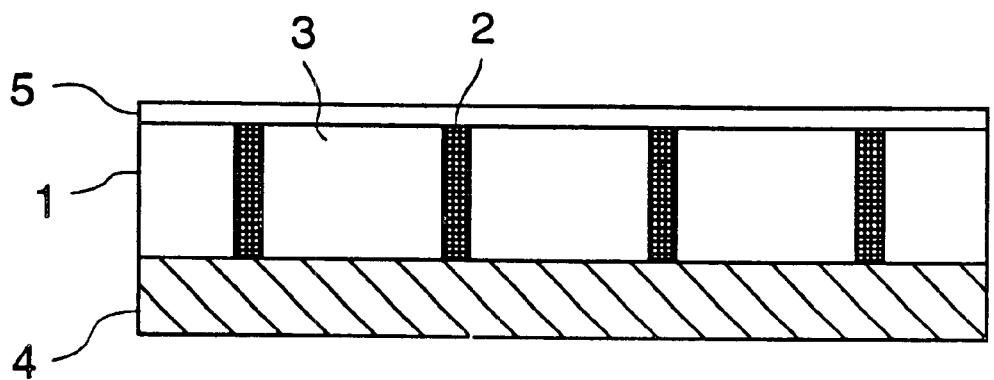
FIG. 1 is a sectional view of a stimulable phosphor sheet having microcells surrounded by grid.
Figure 2:
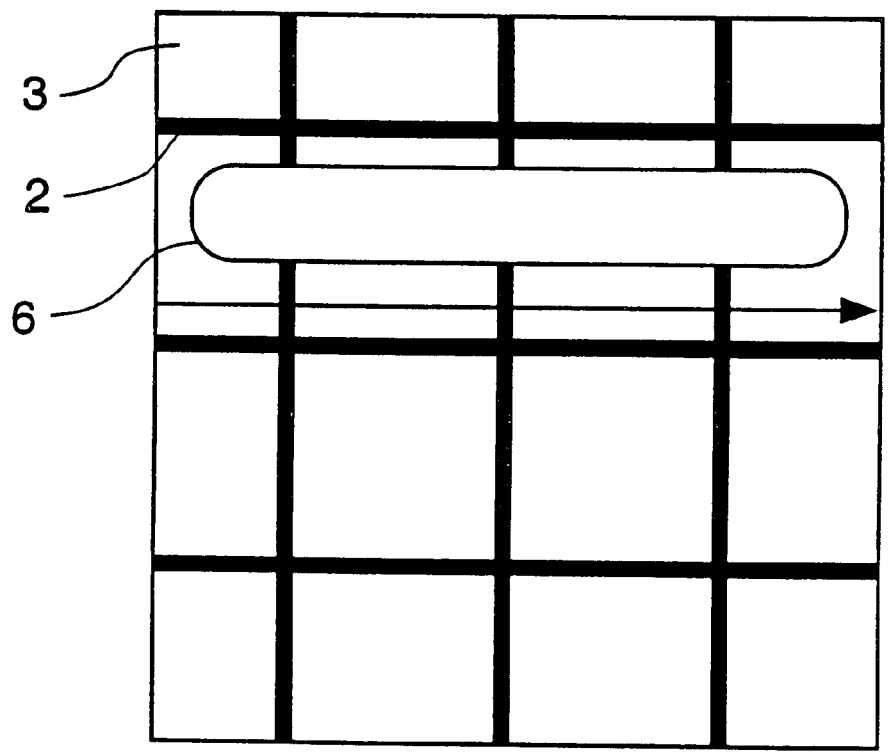
FIG. 2 is a plane view of the stimulable phosphor sheet of FIG. 1.

FIG. 1 and FIG. 2 together indicate a stimulable phosphor sheet having microcells surrounded by grid.

The stimulable phosphor sheet 1 comprises a stimulating light-reflective or light-absorbent grid 2 and stimulable phosphor-containing microcells 3 surrounded by the grid 2. Under the grid 2 and microcells 3 are provided a support film 4. On the grid 2 and microcells 3 are placed a transparent protective film 5. The grid 2 is generally made of metal or plastic resin. The microcells 3 comprise stimulable phosphor particles and a binder. The stimulable phosphor sheet 1 has a thickness of, generally, 20 $\mu$m to 1 mm, preferably 50 $\mu$m to 500 $\mu$m. The grid 2 preferably has a thickness of 1 $\mu$m to 50 $\mu$m, and the microcell 3 preferably has a width or a length in the range of 10 $\mu$m to 500 $\mu$m. Known stimulable phosphor sheets having a grid and stimulable phosphor-containing area surrounded by the grid are also employable for performing the method for processing electric signals of a radiographic image according to the invention.

In the present specification, the stimulating lightreflective grid means a grid reflecting or scattering the stimulating light beam well. Examples of the materials of the stimulating light-reflective grid include glass, ceramic material and plastic material (i.e., resin material). For enhancing the reflection, resin material containing a great number of light-reflecting particles such as white pigments (e.g., titanium dioxide particles, barium sulfate particles) are also employable. A thin film reflecting the stimulating light beam may be provided between the grid and the microcells, so as to further enhance the reflection.

As the stimulable phosphor incorporated into the microcell, a phosphor giving a stimulated emission of a wavelength in the range of 300 to 500 nm when it is irradiated with a stimulating light beam of a wavelength in the range of 400 to 900 nm is preferably employed. In Japanese Patent Provisional Publications No. 2-193100 and No. 4-310900, some examples of the stimulable phosphors are described in detail. Examples of the preferred phosphors include divalent europium or cerium activated alkaline earth metal halide phosphors, and cerium activated oxyhalide phosphors.

The stimulable phosphor is usually used in the form of particles. The phosphor particles and a binder are well mixed in an appropriate solvent to give a coating dispersion for preparing the phosphor sheet.

The stimulable phosphor sheet of the invention can be produced, for example, in the following manner.

First, a sheet of stimulating light-reflective material is placed and fixed on a support with an adhesive to prepare a stimulating light-reflective layer. On the stimulating ray-reflective layer, a light-sensitive dry film was placed and fixed. Thus formed layered composition is then exposed to light through a photo mask, and developed. The exposed areas of the light-sensitive dry film are etched out to prepare a grid of stimulating light-reflective material.

Independently a flexible phosphor sheet is prepared from a coating dispersion comprising stimulable phosphor particles and a binder. The prepared sheet is placed on the grid, and pressed or heated to sink into the areas (i.e., microcells) in the grid. Thus, a stimulable phosphor sheet is produced. The pressed flexible sheet may be peeled off, and the formed gaps may be filled with the stimulating light-reflective material. Further, the microcells surrounded by the grid may be filled with the coating dispersion to produce the stimulable phosphor sheet. Otherwise, the microcells may be filled with a stimulable phosphor, and then the firing procedure may be performed to produce the stimulable phosphor sheet. The stimulable phosphor sheet can be also produced by depositing a stimulable phosphor in the microcells surrounded by the grid.

The electric signals to be processed by the method of the invention are obtained from the stimulable phosphor sheet 1, for instance, by irradiating the phosphor sheet with a radiation (such as X-rays) having passed through an object or having radiated from an object to record a radiation image of the object in the form of latent image; scanning the stimulable phosphor sheet with a stimulating light beam to release the radiation image as light emission (i.e., stimulated emission); and photo-electrically detecting the emitted light.

In FIG. 2, the step of scanning the stimulable phosphor sheet with a stimulating light beam is illustrated. The stimulating light beam is scanned on the stimulable phosphor-containing microcells 3 in the direction of "arrow" along the one-dimensional partition of the grid 2 as is shown by numeral 6. The microcell 3 scanned with the stimulating light beam 6 emits a stimulated emission in an amount proportional to a radiation energy recorded (or stored) therein. The stimulated emission is collected and converted into the corresponding electric signals in a photoelectric converting means (e.g., photomultiplier). The electric signals are then transferred to a signal processing means to perform the signal processing of the invention.

The method of the signal processing according to the invention is further described in more detail.

(1) Detection of Signal Strength I(x,y) of Microcell

Figure 3:
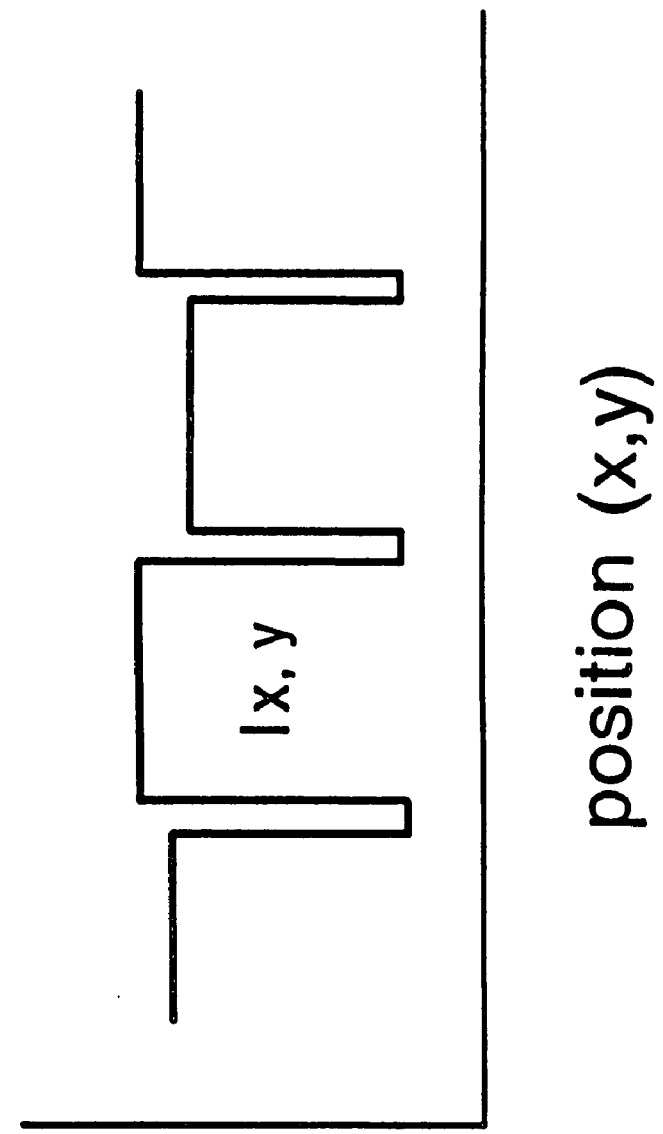
FIG. 3 graphically illustrates electric signals read out of the stimulable phosphor sheet.

In FIG. 3, a series of electric signals are graphically illustrated, in which the axis of abscissas means a position and the axis of ordinates means a signal strength I. In the graph of FIG. 3, the signals of a stimulating light beam-reflective grid is observed as a regularly-appearing sharp depression. The desired signal strength I of a microcell is detected between the adjoining two grid signals. Then, the coordinate (x,y) of the microcell for which the signal strength I is detected is determined from the order of the detected grid and the size information of the stimulable phosphor sheet (and/or grid). Thus, a signal strength I (xfy) of a microcell (x,y) is obtained.

(2) Structural Correction

In advance of performing the radiographic image recording and reproducing method, the base sensitivity $I_0(x,y)$ of each microcell (x,y) of the stimulable phosphor sheet is determined. For the determination of the base sensitivity, the overall surface of the stimulable phosphor sheet is uniformly irradiated with X-rays, and scanned in the same manner as above to obtain a base sensitivity of each microcell. The base sensitivity values slightly vary depending on the positions of microcells, because it is difficult to coat uniformly a stimulable phosphor-containing dispersion on a support film having a grid thereon.

The correction of sensitivity is performed using a correcting value which is obtained by the following equation, using the signal strength I(x,y) and the corresponding base sensitivity $I_0(x,y)$:

$$\text{correcting value} = I(x,y)/I_0(x,y)$$

In the structural correction, I(x,y) detected in each microcell is corrected using the above-obtained correcting value. Thus, the radiographic image which has been subjected to structural correction and therefore which has reduced noises originating from nonuniformity of the stimulable phosphor sheet is reproduced.

(3) Processing on Moire

The correcting value obtained above for each microcell is processed to obviate appearance of moire which is produced by dividing a stimulable phosphor sheet into regularly arranged multiple microcells. The processing is performed appropriately in consideration of a size of the microcell and a pixel size for reproduction of the radiation image.

Figure 4:
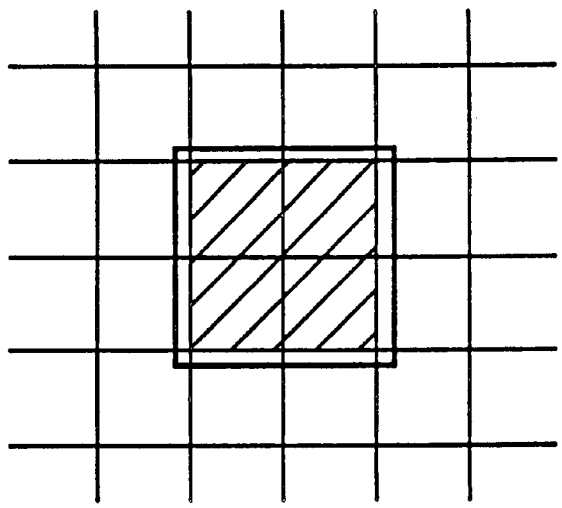
FIG. 4 schematically illustrates relationships between the pixel size and the microcell size.
Figure 4:
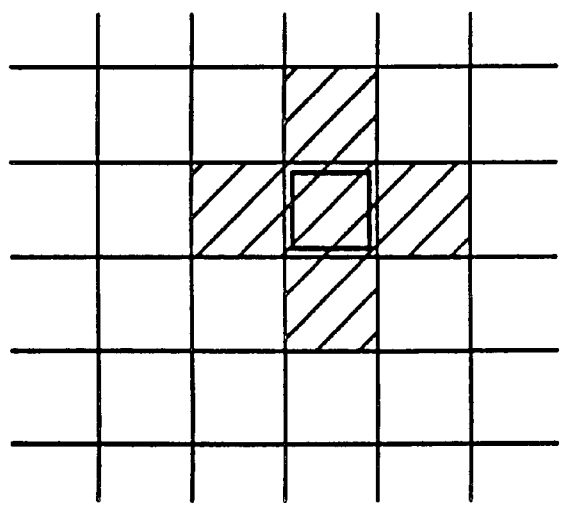

FIG. 4 shows two figures for schematically illustrating two cases of relationship between the microcell size and the pixel size. FIG. 4(1) stands for the case in which the pixel size is larger than the microcell size. FIG. 4(2) stands for the case in which the pixel size is smaller than the microcell size.

In the case of FIG. 4(1) [pixel size>microcell size], correcting values of plural microcells [in shadow area] embraced in the target pixel [in thick square] are calculated to give an average correcting value, and thus obtained average correcting value is adopted for correction. If the pixel embraces a portion of one or more microcells, appropriate arithmetical operations such as round-up, round-off, weighted calculation can be done.

In the case of FIG. 4(2) [pixel size<microcell size] or in the case that the pixel size is identical to the microcell size, an appropriate correcting value is obtained from the correcting value for the corresponding microcell and the correcting values for the microcells adjacent to the target microcell. In the case of FIG. 4(2), the correcting values of the shadowed microcells are submitted to calculation to give an appropriate correcting value for the target pixel [in thick square]. Even in this case, appropriate arithmetical operations such as weighted calculation can be done, in consideration of the difference between the microcell and the pixel, and positional relationship.

The above-described corrections are effective to give a radiographic image without moire.

The radiographic image can be reproduced using a known displaying device, such as CRT or a photosensitive film. The radiographic image can be stored in other memory devices such as an optical recording disc and a magnetic recording disc.

What is claimed is:

1. A method for processing electric signals of a radiographic image which are obtained by the steps of scanning a stimulating light beam on a stimulable phosphor sheet comprising a stimulating light-reflective or light-absorbent grid and stimulable phosphor-containing microcells surrounded by the grid and having a radiographic image recorded therein in a direction along the grid and photoelectrically collecting in sequence stimulated emissions emitting from the stimulable phosphor-containing microcells, which comprises the steps of:

detecting a signal of a grid surrounding a microcell and a signal strength I corresponding to the microcell surrounded by the grid, so as to determine a signal strength I(x,y) in a microcell residing in a position (x,y) which is determined from a size information of the stimulable phosphor sheet and an order of the detected signal corresponding to the grid;

determining a correcting value for the signal strength I(x,y) according to the following formula:

$$\text{correcting value} = I(x,y)/I_0(x,y)$$

wherein $I_0(x,y)$ is a base sensitivity strength which is predetermined in the microcell residing in the position (x,y); and processing each signal strength detected in each microcell using each correcting value determined in each microcell, in consideration of a predetermined pixel size of the radiographic image, to obtain a corrected radiographic image data.

2. The method of claim 1, wherein the last step for processing each signal strength detected in each microcell comprises, if the pixel size is larger than the size of microcell and the pixel comprises plural microcells, obtaining an average of correcting values of the microcells and using the average correcting value for the pixel comprising plural microcells.

3. The method of claim 1, wherein the last step for processing each signal strength detected in each microcell comprises, if the pixel size is equal to or smaller than the size of microcell, using a correcting value which is determined from the correcting value of the microcell, in consideration with correcting values of its adjacent microcells.

* * * * *